United States Patent

Onoda et al.

[11] 4,206,967
[45] Jun. 10, 1980

[54] OPTICAL FIBER

[75] Inventors: Seiichi Onoda, Tokorozawa; Shojiro Kawakami; Shigeo Nishida, both of Sendai; Toshiki P. Tanaka, Tokyo; Tsuneo Suganuma, Tokorozawa; Masao Sumi, Higashi-yamato, all of Japan

[73] Assignees: Hitachi, Ltd.; Hitachi Cable, Ltd., both of Tokyo, Japan

[21] Appl. No.: 921,220

[22] Filed: Jul. 3, 1978

Related U.S. Application Data

[63] Continuation-in-part of Ser. No. 692,994, Jun. 4, 1976, abandoned.

[30] Foreign Application Priority Data

Jun. 6, 1975 [JP] Japan .................. 50-67642

[51] Int. Cl.² .................................. G02B 5/14
[52] U.S. Cl. .................................. 350/96.33
[58] Field of Search .................................. 350/96.33

[56] References Cited

U.S. PATENT DOCUMENTS 3,997,241  12/1976  Nishida et al. .................. 350/96.33

OTHER PUBLICATIONS

Kawakami et al., "Characteristics of a Doubly Clad Optical Fiber . . . " IEEE Jour. of Quantum Elec., vol. QE-10, No. 12, Dec. 1974, pp. 879-887.
Miyagi et al., "Bending Losses of a Double Clad Slab Waveguide" Optics Communications, vol. 14, No. 1, May 1975, pp. 123-125.

Primary Examiner—Rolf G. Hille
Attorney, Agent, or Firm—Craig & Antonelli

[57] ABSTRACT

A three-layer structure optical fiber comprises a first transparent dielectric core layer having a relatively high refractive index, a second transparent dielectric intermediate layer having a relatively low refractive index and a third transparent dielectric cladding layer having an intermediate refractive index wherein the parameter of the optical fiber is determined as follows:

$$Bz \leq \frac{2.75C}{\eta_0(1-q^2)(1-\frac{2}{V})\{\epsilon^2 - \frac{U_{11}^2}{P^2}\exp(-\frac{2}{V})\}},$$

where B is the bandwidth of the signal to be transmitted, z is the transmission distance, C is the velocity of light in vacuum, $\eta_0$ is the refractive index of the core layer, q is the ratio of refractive indices between the core layer and second layer, $\hat{V}$ = normalized frequency, $$\epsilon^2 = \frac{1-p^2}{1-q^2},$$

p is the ratio of refractive index between the core layer and the third layer, and $U_{11} = 2.405$.

6 Claims, 8 Drawing Figures

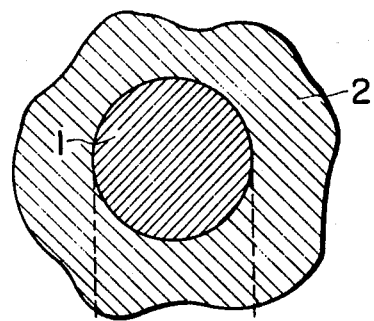
FIG. IA
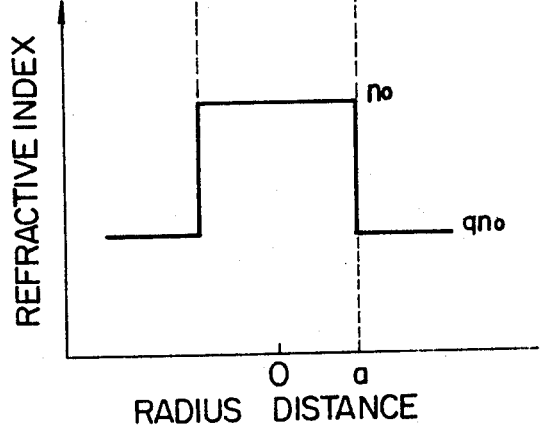
FIG. IB
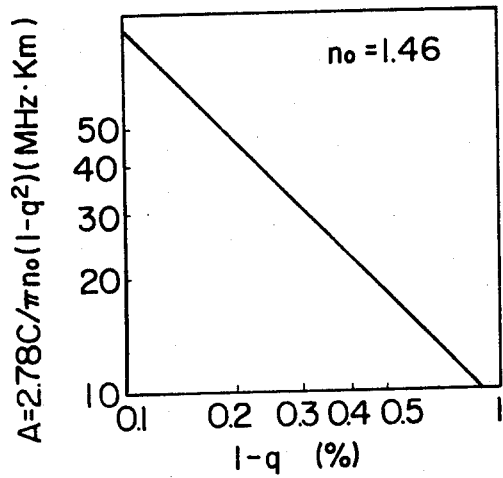
FIG. 2A

OPTICAL FIBER

This is a continuation-in-part of co-pending Ser. No. 692,994, filed June 4, 1976, now abandoned.

BACKGROUND OF THE INVENTION

1. Field of the Invention

This invention relates to an optical fiber or an optical waveguide. More particularly, the present invention relates to a so-called W-type optical waveguide comprising a first transparent dielectric center layer having a relatively high refractive index, a second transparent dielectric intermediate layer having a relatively low refractive index and a third transparent dielectric cladding layer having an intermediate refractive index.

2. Description of the Prior Art

In recent years, transmission loss of so-called optical fiber for optical trnsmission has been reduced remarkably and practical applications of an optical communication system are now believed to be merely a matter of time.

In utilizing optical fibers for video communications which is believed to be one of the most significant fields of their application, however, there are several problems yet to be solved.

From the viewpoint of economy of the communication system, for instance, it is of utmost importance to make the best of the low transmission loss of the optical fiber. To accomplish this object, the transmission bandwidth of the optical fiber must be broadened. That is to say, the transmission band of the optical fiber is determined primarily by the group delay differences between the number of transmission modes used, and the group delay differences increase in proportion to the transmission distance. Extension of the transmission distance to take advantage of minimization of the transmission loss of the optical fiber therefore results in restriction of the transmission bandwidth.

For the above-mentioned reason, a given transmission line is evaluated in terms of the product of the width of its transmission bandwidth and the distance of transmission.

A conventionally known optical fiber of the type (usually referred to as a "single clad fiber") has a two-layer construction comprising a center layer of relatively high refractive index (which is usually referred to as the "core") and a cladding layer of a relatively low refractive index. This type of optical fiber, however, has the problem that its low transmission loss characterizing feature cannot be utilized to a maximum extent because of the following two points.

Namely, if the difference between the two refractive indices are reduced so as to thereby broaden the range of available bands (that is to say, to minimize the group delay difference), the transmission capability of the optical fiber also is reduced to such an extent that the optical fiber is no longer practical. If the difference between the two refractive indices is increased, on the other hand, in order to enhance the transmission capability, the group delay difference is also increased, thereby narrowing the bandwidth. Because of these problems, the conventional optical fiber of the two-layer configuration cannot be used satisfactorily for a long distance transmission.

SUMMARY OF THE INVENTION

A primary object of the present invention is to provide an optical fiber having a wide transmission bandwidth which may be suitably used for video transmission and which has a large product of transmission bandwidth and transmission distance.

To effectively accomplish the abovementioned object, the present invention provides an optical waveguide having a three-layer construction (hereinafter referred to as a W-type optical fiber) which comprises a first transparent dielectric center layer having a relatively high refractive index $n_o$, a second transparent dielectric intermediate layer having a relatively low refractive index $qn_o$ and a third transparent dielectric cladding layer having an intermediate refractive index $pn_o$, whereby the parameter of the optical fiber is determined as follows.

$$Bz \leq \frac{2.75C}{\eta_o(1-q^2)(1-\frac{2}{\hat{V}})\{\epsilon^2 - \frac{U_{11}^2}{\hat{V}^2}\exp(-\frac{2}{\hat{V}})\}},$$

where B is the bandwidth of the signal to be transmitted, z is the transmission distance, namely, the fiber length, C is the velocity of light in vacuum, $$\epsilon^2 = \frac{1-p^2}{1-q^2},$$

$\hat{V}$ is the normalized frequency, that is $$\frac{2\pi a\eta_o\sqrt{1-q^2}}{\lambda}$$

(a is the core radius, $\lambda$ is the wave length of light), and $U_{11} = 2.405$.

In the W-type optical fiber of the above-described construction, the value of the product Bz of the width of the transmission band B and the transmission distance z becomes larger than the value of the product of the bandwidth and the transmission distance which are determined by the capacity of a terminal receiver to be located at the end of a transmission line. Accordingly, a primary feature of the optical fiber's low transmission loss can be effectively utilized for the transmission of signals requiring a wider bandwidth.

BRIEF DESCRIPTION OF THE DRAWINGS

FIG. 1A is a sectional view showing a central portion of a conventional single clad optical fiber;

FIG. 1B is a distribution chart of the refractive indices for FIG. 1A;

FIG. 2A is a diagram illustrating the correlation between 1-q and A of the conventional single clad optical fiber;

DETAILED DESCRIPTION OF THE PRIOR ART

Figure 3A:
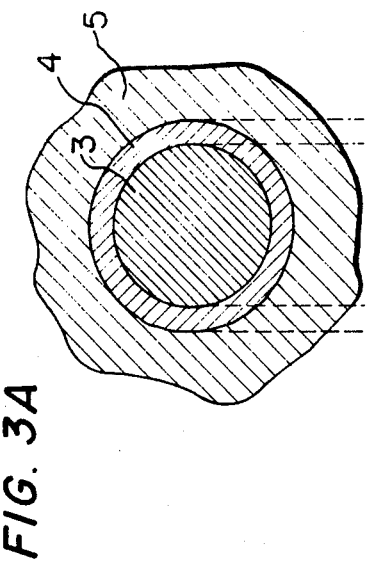
FIG. 3A is a sectional view showing a central portion of the three-layered optical waveguide in accordance with the present invention.

FIG. 1A is a sectional view showing the sectional structure of a so-called single clad type optical fiber having a core or a center layer 1 of a relatively high refractive index ($n_o$) and a clad or a cladding layer 2 of a relatively low refractive index ($qn_o$, $q<1$); FIG. 1B is a chart illustrating the distribution of refractive index inside the optical fiber.

In the clad type optical fiber as described above, HE, EH, TE and TM modes can be present as propagation modes, but the following modes in parentheses are mutually degenerate:

($HE_{1m}$)
($HE_{2m}$, $TE_{om}$, $TM_{om}$)

($HE_{n+1,m}$, $HE_{n-1,m}$)

where $n \geq 2$.

As can be seen from the above, the $HE_{nm}$ mode ($\eta \geq 1$) is included in the group of all propagation modes; hence, the following discussion will treat only the HE mode as typical of the propagation modes.

First, the characteristic equation of the HE mode can be approximated by $$J\eta(\mu)/\mu J_{n+1}(\mu) = K_n(\hat{w})/\hat{w} K_{n+1}(\hat{w})$$

where
$J_n$ is a Bessel function;
$K_n$ is a modified Bessel function;
u is an eigen value in the radial direction of a core; and
$\hat{w}$ is an eigen value in the radial direction of the cladding.

Further, the above-mentioned u and $\hat{w}$ satisfy the following equation $$u^2 + \hat{w}^2 = \hat{v}^2 = n_o^2 k_o^2 a^2(1-q^2)$$

where
$k_o$ is the wave number of light in vacuum and is determined by $k_o = \omega/c = 2\pi/\lambda$ ($\omega$: optical angular frequency, $\lambda$: wave length); and $\hat{v}$ is the normalized frequency.

The eigen value u is given approximately by the equation $$u \approx U \exp(-1/\hat{v})$$

where U is an assymptotic value of u when $\hat{v} \to \infty$. The value corresponding to the $HE_{nm}$ mode is given by the m-th zero of the Bessel function $J_{n-1}$.

On the other hand, the phase constant $\beta$ is given by the following equation $$\beta^2 = n_o^2 k_o^2 - (u/a)^2$$

Hence, the group delay $d\beta/d\omega$ is expressed approximately by $$d\beta/d\omega \approx \frac{n_o}{c}\left[1 + \frac{1-q^2}{2} \frac{U^2}{\hat{v}^2}(1 - \frac{2}{\hat{v}})\exp(-\frac{2}{\hat{v}})\right]$$

Next, explanation will be given of the distribution of the propagation modes. Since the number N of the propagation modes is proportional to the square of the normalized frequency $\hat{v}$, the mode density $\rho$ (U) at U can be expressed by the following equation (assuming that the mode number is sufficiently large and takes a continuous distribution):

$$\rho(U) = 2U/(U_{max}^2 - U_{min}^2)$$

where $U_{max}$ and $U_{min}$ are the maximum and minimum values of U and given by the following formula in the case of the clad type optical fiber respectively;

$$U_{max} = \hat{v} \exp(1/\hat{v})$$

$$U_{min} = U_{11} = 2405.$$

The following point can be made as to the baseband frequency response. Provided that each propagation mode propagates independently with uniform power, the baseband transmission function $G(\omega_s)$ ($\omega_s$: baseband angular frequency) is determined by the following equation with a transmission distance being z:

$$G(\omega_s) = \int_{U_{min}}^{U_{max}} \rho(U) \exp(-j\omega_s \frac{d\beta}{d\omega^z}) dU$$

$$= \exp(-j\omega_s \tau \lambda)\{1 - \exp(-j\xi)\}/j\xi$$

where j is an imaginary number unit and $$\tau = \frac{n_o}{c}\left\{1 + \frac{1-q^2}{2}(1 - \frac{2}{\hat{v}})\exp(-\frac{2}{\hat{v}})\frac{U_{11}^2}{\hat{v}^2}\right\},$$

$$\xi = \omega_{sl}^3 \frac{n_o}{c} \frac{1-q^2}{2}(1 - \frac{2}{\hat{v}})\exp(-\frac{2}{\hat{v}})\frac{U_{max}^2 - U_{min}^2}{\hat{v}^2}.$$

When the first term of the abovementioned equation for $G(\omega_s)$ is neglected since it is a dead time element, the transmission function G is expressed by the equation:

$$G(\xi) = \{1 - \exp(-j\xi)\}/j\xi$$

When the transmission band B of the optical fiber is defined by a 3 dB band in 20 $\log_{10} G(\epsilon)$, the product of the transmission band Bc for the clad type fiber and the transmission distance z (hereinafter the product is referred to simply as the product Bz) is given by the following equation:

$$B_o z = T_c A \quad (1)$$

where $$A = \frac{2.78c}{\pi n_o(1-q^2)}$$

$$1/\Gamma_c = (1 - \frac{2}{\hat{v}})\left\{1 - \frac{U_{11}^2}{\hat{v}^2} \exp(-\frac{2}{\hat{v}})\right\}$$

Figure 2B:
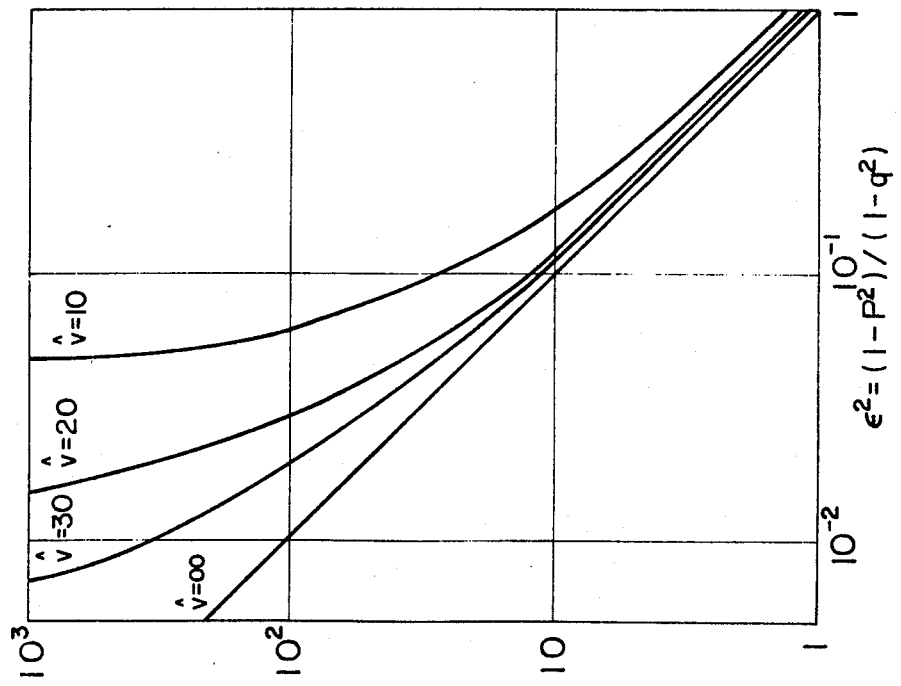
FIG. 2B is a diagram illustrating the correlation between T and $\epsilon_2$ of the conventional single clad fiber.

FIG. 2A illustrates the correlation between A and 1-q (with the proviso that $n_o$ is equal to 1.46). FIG. 2B illustrates the correlation between the parameter $\epsilon^2$ and the coefficient T in terms of the parameter v, whereby the Tc value corresponds to a T value corresponding to $\epsilon^2 = 1$.

The foregoing discussion is focused on the analysis of the product Bz of the clad-type optical fiber.

A conventional clad-type optical fiber is usually designed such that the difference in the refractive indices is larger than about 0.7%, as mentioned above.

If an outer cladding layer such as of a polymer is provided as a jacket on the fiber and then subjected to cabling, various kinds of stresses are applied to the fiber whereby the transmission characteristics of the optical fiber become unstable due to the photo-elastic effect and micro-bending of the same. To solve this problem and thus stabilize the transmission characteristics of the fiber, it is customary in the art to select the difference of the refractive indices exceeding a certain level such as about 0.7%, as mentioned above.

Accordingly, when a 1-q value of 0.7% and a core diameter of 50 μm are selected in this instance, $\hat{v}$ has a value on the order of 30. From the results shown in FIG. 2A, the product Bz of the clad-type optical fiber becomes $$B_c z = 14 \text{(MHz.km)}$$

since $$A = 12.7 \text{(MHz.km)},$$

and $$Tc = 1.1.$$

In order to obtain a desired specification in the case of an optical communication system, the following factors should be taken into account.

The most significant field of application of optical communications in video communications. Even if an analog system is employed for this purpose, a bandwidth of 4 MHz is necessary. In an ordinary communication system using a GaAlAs semiconductor laser as a light source and a silicon avalanche photodiode as a light detector, a minimum acceptable optical power $P_{req}$ is given by the following equation:

$$P_{req} = \frac{2eM^x(S/N)B}{R} \left[ 1 + \sqrt{1 + \frac{1}{2e^2 M^{2(1+x)} (S/N) B \frac{4kT}{R_{eq}} F_{amp}}} \right]$$

where
- e: electronic charge
- M: current amplification
- x: excess noise factor
- (S/N): required signal-to-noise ratio
- B: signal band
- k: Boltzmann' constant
- T: temperature
- $R_{eq}$: equivalent resistance
- $F_{amp}$: noise figure of amplifier
- R: sensitivity The following case is a typical example:
- $e = 1.6 \times 10^{-9}$ (coulomb)
- $M^2 = 5$ dB
- $x = 0.5$
- (S/N) = 60 dB
- B = 4 MHz
- $k = 1.38 \times 10^{-23}$ J/°k.
- T = 300° k.
- $R_{eq} = 1$ k ohms
- $F_{amp} = 5$ dB
- R = 0.48 A/Watt In this case, the minimum acceptable optical power $P_{req}$ becomes $-21$ dBm. On the other hand, the level of light that can be fed into the GaAlAs semiconductor laser is on the order of 0 dBm; hence, the loss margin in the transmission line becomes 21 dB. Meanwhile, the transmission loss of the optical fiber cable is about 4 dB/Km at the wavelength of the semiconductor laser ($=0.835$ μm). (When a nylon coating of a thickness of about 400 μm is applied to an optical fiber comprising a phosphosilicate glass as a core and a silica glass as a cladding and having a 50 μm diameter and a difference of refractive indices of about 0.75%, then four of these fibers are twisted together to form a unit and finally the resulting four units are cabled, the fiber cable so formed has a transmission loss of $4 \pm 1$ dB/km at $\lambda = 0.835$ μm over a length of 1 kn.)

Presuming that there is no splicing loss in the repeater spacing, the distance becomes as long as 5.25 kn.

In order to feed a single of a bandwidth of 4 MHz to the optical fiber, therefore, it is necessary to make the product Bz larger than 21 MHz.Km. As mentioned in the foregoing paragraph, however, the conventional clad type optical fiber affords a bandwidth of only about 14 MHz.km. Accordingly, it is by all means necessary to increase the bandwidth.

In the W-type optical fiber in accordance with the present invention, on the other hand, the product of the transmission distance and bandwidth can be obtained in a manner as described in the paragraphs to follow.

DETAILED DESCRIPTION OF THE INVENTION

FIG. 3A illustrates a sectional construction of the W-type optical fiber wherein the core, intermediate layer and cladding are indicated, respectively, by the reference numerals 3,4 and 5. Likewise the refractive indices of these layers are $n_o$, $qn_o$ and $pn_o$ ($q < p < 1$) in the order given. Similarly, the core radius, and thickness of the intermediate layer are indicated by a and $\delta a$, respectively.

Figure 3B:
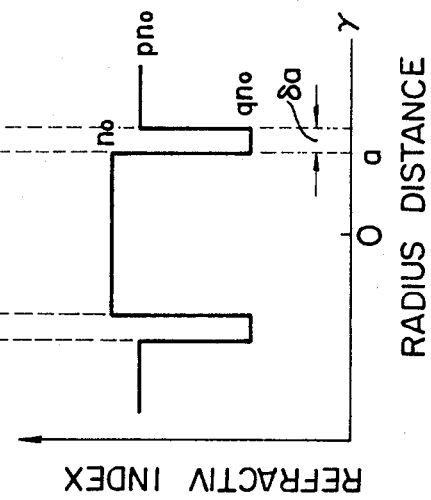
FIG. 3B is a distribution chart of refractive indices for FIG. 3A.

FIG. 3B illustrates the distribution of the refractive index inside the fiber.

The W-type fiber of the above-described construction can be considered as such a type wherein the clad type fiber shown in FIG. 1 is perturbed by the outer layer 5. In other words, the incremental $\Delta\beta$ of the phase constant $\beta$ due to the addition of the outer layer 5 is extremely small (i.e. on the order of about $10^{-9}$ in the case of an ordinary W-type optical fiber). In this instance, the field distribution hardly causes any change, but depending on the modes, $\Delta\beta$ becomes real (propagation modes) and complex (leaky modes).

Namely, among the propagation modes in the original clad-type optical fiber, those modes which have a mode index between $pn_o$ and $n_o$ become propagative and those having a mode index between $qn_o$ and $pn_o$ become leaky.

The transmission loss in the leaky mode $\alpha$ is given approximately by the following equation:

$$\alpha = \frac{3.47 \times 10^{10}}{\beta a^2} \frac{1-q^2}{p^2-q^2} \frac{u^2 \hat{w}^2 |w|}{\hat{v}^4} \exp(-2\delta\hat{w}) \text{ (dB/km)}$$

where u, $\hat{w}$ and w are eigen values in the radial direction of the core, intermediate layer and cladding, respectively, and $\beta$ is a propagation constant. The unit of the core radius a is in microns.

As will be understood from the above equation, the loss of the leaky mode $\alpha$ can easily be controlled by arranging the thickness $\delta$ of the intermediate layer. That is to say, since the loss of the leaky mode becomes larger as the order of the leaky mode becomes higher, the effect of all the leaky modes over the transmission band can be neglected if the loss of the leaky mode of the lowest order is preset to exceed a certain value (for example, 10 dB).

Figure 4:
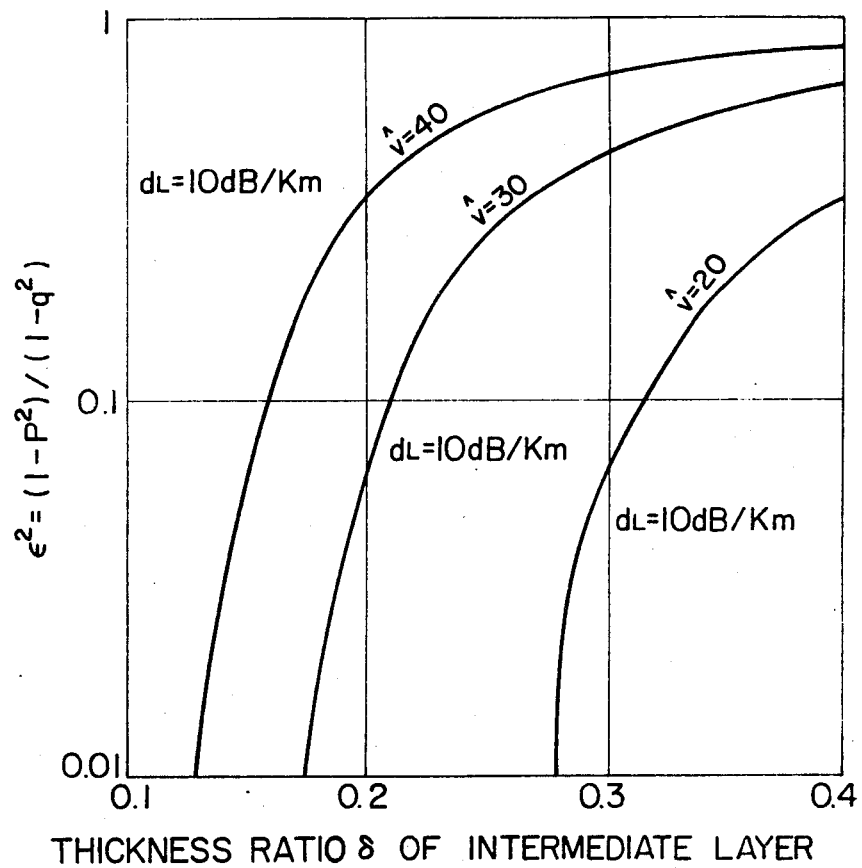
FIG. 4 is a diagram illustrating the correlation between $\epsilon^2$ and $\delta$ when the loss of a lowest order leaky mode is made constant in the W-type optical fiber of the present invention.

FIG. 4 illustrates the correlation between the parameter of the refractive index, i.e., $\epsilon^2=(1-p^2)/(1-q^2)$, and the thickness $\delta$ of the intermediate layer when the transmission loss $\alpha_L$ of the lowest order leaky mode is made constant. When an attenuation is given to the leaky mode sufficiently, only the transmission mode may as well be considered for the W-type optical fiber.

Now, the U value (U max) of the highest order propagation mode in the W-type optical fiber can be approximated by the following equation;

$$U_{max} = \epsilon \hat{v} \exp(1/\hat{v})$$

Since the lowest order propagation mode is $HE_{11}$, $U_{min}$ is given by the equation;

$$U_{min} = U_{11} = 2.405$$

When the above-mentioned results are applied to the aforementioned formula (1), the product Bz of the W-type optical fiber is given by the following equation:

$$B_w z = \Gamma_w A$$

$$1/\Gamma_w = (1 - \frac{2}{\hat{v}})\{\epsilon^2 - \frac{U_{11}^2}{\hat{v}^2} \exp(-\frac{2}{\hat{v}})\}$$

Therefore, the parameters of W-type optical fiber in accordance with this invention are determined due to the following relationship in order to obtain a optical fiber which can transmit a signal with bandwidth B over distance z without a repeater;

$$\Gamma_w A = \frac{2.75\ C}{\eta \alpha (1-q^2)(1-\frac{2}{\hat{v}})\{\epsilon^2 - \frac{U_{11}^2}{\hat{v}} \exp(-\frac{2}{\hat{v}})\}}$$

In comparison with the clad-type optical fiber, $\Gamma_w$ is equal to $\Gamma$ in FIG. 2B. As a consequence, the expansion ratio of the W-type to the clad-type optical fiber is given by the following equation:

$$\gamma = \frac{B_w z}{B_c z} = \frac{1 - \frac{U_{11}^2}{\hat{v}^2} \exp(-\frac{2}{\hat{v}})}{\epsilon^2 - \frac{U_{11}^2}{\hat{v}^2} \exp(-\frac{2}{\hat{v}})}$$

Figure 5:
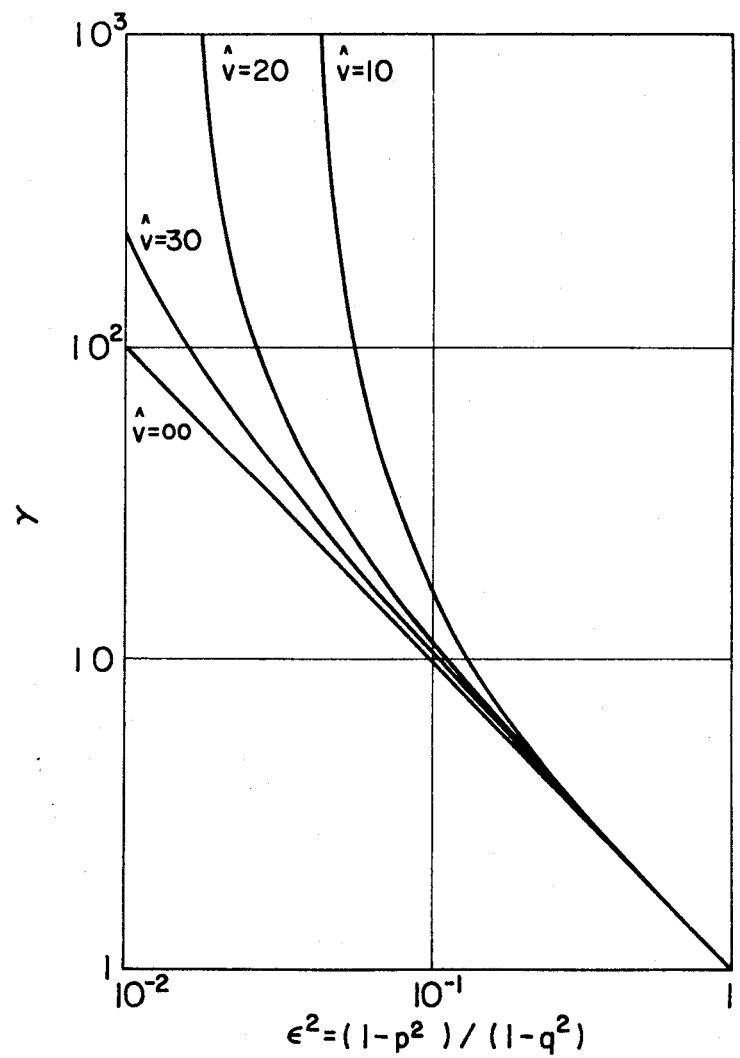
FIG. 5 is a diagram illustrating the correlation between the band ratio between a conventional single clad type waveguide and the W-type optical fiber of the present invention and $\epsilon^2$.

FIG. 5 illustrates the correlation between $\epsilon^2$ and $\gamma$. For example, if the bandwidth of signal to be transmitted is 4 MHz, the span loss margin in the transmission line is 21 dB, and the transmission loss of the optical fiber is 4 dB/km, as described before, the expansion ratio $\gamma$ of the transmission bandwidth of the W-type fiber to the clad-type fiber must be larger than 3/2. As is clear from FIG. 5, however, $\gamma$ is given approximately by the following equation when v is sufficiently large;

$$\gamma = 1/\epsilon^2$$

In order to accomplish the above relation, therefore, the following relation is established:

$$\epsilon^2 = (1-p^2)/(1-q^2) < \tfrac{2}{3}$$

In this instance, since p and q are generally very close to 1 (one), the following relation may as well be satisfied to accomplish the said relation;

$$\epsilon^2 \approx (1-p)/(1-q) < \tfrac{2}{3}$$

It would now be apparent from the foregoing explanation that by making the ratio of the difference between the square of the refractive index of the core and that of the clad to the difference between the square of the refractive index of the core and that of the intermediate layer smaller than 3/2 in the W-type optical fiber, there is obtained an optical fiber having a bandwidth which is wider by 3/2 times that of the clad-type optical fiber. In addition, if $\epsilon^2$ is made even smaller, a wider bandwidth can naturally be obtained, as will be apparent to one of ordinary skill in the art.

In adapting the optical fiber of the present invention to a line for a practical application, it is necessary to adjust the thickness $\delta$ of the intermediate layer, refractive index q thereof and the refractive index p of the cladding within the range of the above-mentioned principle, in view of outer stresses and like factors.

When a jacket is coated onto a starting wire of the abovementioned optical fiber, the transmission loss exhibits the increase generally. When ordinary nylon is used as a polymer material, it is necessary that $1-q>0.6\%$ in order to make the increase of loss due to the jacket negligible.

As a method for producing the intermediate layer, a chemical vapor deposition (CVD) method wherein two kinds of thin layers which have suitable refractive indices corresponding to those of the intermediate layer and the core are laminated onto the inner wall of a glass pipe which corresponds to the cladding. According to this method, a longer reaction time is required to obtain the intermediate layer of a thicker $\delta$ a, thereby resulting in lowering of the producibility. When the thickness is less than 0.5, the intermediate layer can be preformed within a shorter period of time to fully materialize the characterizing features of the W-type optical fiber.

Depending on the times required, $P_2O_5$ or $GeO_2$ are often used to adjust the refractive index of the core of the optical fiber to a desired value. When the above-mentioned value $(1-q)$ is made smaller in this case, that is to say, when the amount of deposition is small, the distribution of the refractive indices in the radial direction becomes non-uniform (like the annual ring of a tree). This problem can be eliminated by making 1-p larger than 0.1% $(1-p>0.1\%)$.

A preferred embodiment of the W-type optical fiber in accordance with the present invention is described in the following paragraphs.

A W-type optical fiber is prepared by a chemical vapor deposition method which comprises a core of phosphosilicate glass, an intermediate layer of borosilicate glass and a cladding of a silica glass. The core has a radius of 25 $\mu$m; the intermediate layer has a thickness of 5 $\mu$m; and the cladding has a radius of 70 $\mu$m. The core has a refractive index of 1.46 and the difference of refractiv indices of the core and the intermediate layer and between the core and the cladding are 0.66% and 0.27%, respectively.

Separately, a clad-type optical fiber is prepared which comprises a core of phosphosilicate glass and a cladding of silica glass. Radii of the core and clad are 25 $\mu$m and 70 $\mu$m, respectively, and the core has also a refractive index of about 1.46. The difference of the refractive indices between the core and the cladding is 0.68%.

After a nylon coating of a thickness of 400 μm is applied to each of the optical fibers so formed, four pieces each of the fiber are twisted to form a unit and four units each are cabled in a non-spacer type. Each of the cables thus formed has a length of 1 km and a transmission loss of 4±1 dB/km.

The transmission bandwidth of each of the above-mentioned two optical fibers is measured by a semiconductor laser and the ratio of the bandwidth of the two optical fibers is found to be 2.5. This value is very approximate to the result of the aforementioned analytical calculation.

As mentioned in all the foregoing paragraphs, the present invention provides a wide bandwidth optical fiber having a transmission bandwidth without reducing the merits of an optical fiber, that is, low loss of transmission.

We claim:

1. In a three-layered optical fiber comprising
   a first transparent dielectric center layer having a relatively high refractive index $n_o$ and radius a,
   a second transparent dielectric intermediate layer having a relatively low refractive index $qn_o$ and thickness $\delta a$, and
   a third transparent dielectric cladding layer having an intermediate refractive index $pn_o$,
   the improvement wherein said relatively high refractive index $n_o$, said relatively low refractive index $pn_o$ and said intermediate refractive index $qn_o$ are selected so as to satisfy the following relation $$\frac{2.75\, C}{n_o(1-q^2)(1-\frac{2}{\hat{v}})\{\frac{1-p^2}{1-q^2} - \frac{U_{11}^2}{p^2}\exp(-\frac{2}{\hat{v}})\}} \geq Bz$$

where B is the bandwidth of signal to be transmitted, z is the length of the optical fiber, C is the velocity of light in vacuum, $\hat{v}$ is the normalized frequency, and $U_{11} = 2.405$.

2. The optical fiber as defined in claim 1, wherein the refractive indices of said first transparent dielectric center layer and said second transparent dielectric intermediate layer satisfy the following relation $$1 - q \geq 0.006.$$

3. The optical fiber as defined in claim 1, wherein the thickness $\delta a$ of said second transparent dielectric intermediate layer satisfies the following relation $$\delta a < 0.5 a,$$

where a is the radius of the center layer.

4. The optical fiber as defined in claim 1, wherein said first transparent dielectric center layer contains at least one material selected from the group consisting of $P_2O_5$ and $GeO_2$, and the refractive indices of said first transparent dielectric center layer and said third transparent dielectric cladding layer satisfy the following relation $$1 - p > 0.001.$$

5. The optical fiber as defined in claim 1, wherein B is 4 MHz, z is 5.25 km, and $$\frac{1-p^2}{1-q^2} < \frac{2}{3}$$

6. The optical fiber as defined in claim 1, wherein the transmission loss of a lowest order leaky mode and the transmission length have the following relationship:

$$\alpha_L \cdot Z > 10 \text{dB}$$

$$\alpha_l = \frac{3.47 \times 10^{10}}{\beta a^2} \cdot \frac{1-q^2}{p^2-q^2} \cdot \frac{U^2 \hat{W}^2 |W|}{\hat{v}^4} \exp(-2\delta \hat{w}) [\text{dB/km}]$$

where U, $\hat{W}$ and W are the normalized transverse phase constants in the said center layer to the said cladding layer, $\hat{V}$ is the normalized frequency and $\beta$ is the longitudinal propagation constant.

* * * * *